United States Patent
Duqueine et al.

(10) Patent No.: US 8,066,927 B2
(45) Date of Patent: Nov. 29, 2011

(54) METHOD FOR MAKING A THERMOPLASTIC COMPOSITE PART BY MOLDING

(75) Inventors: Vincent Duqueine, Saint Didier au Mont d'Or (FR); Maurice Guitton, Nova Scotia (CA); Claude Baril, Laval (CA)

(73) Assignee: Carbone Forge, Lentilly (FR)

( * ) Notice: Subject to any disclaimer, the term of this patent is extended or adjusted under 35 U.S.C. 154(b) by 0 days.

(21) Appl. No.: 12/532,994

(22) PCT Filed: Mar. 28, 2008

(86) PCT No.: PCT/FR2008/050548
§ 371 (c)(1),
(2), (4) Date: Jan. 25, 2010

(87) PCT Pub. No.: WO2008/139077
PCT Pub. Date: Nov. 20, 2008

(65) Prior Publication Data
US 2010/0148394 A1 Jun. 17, 2010

(30) Foreign Application Priority Data

Mar. 29, 2007 (FR) .................... 07 54141
Jun. 29, 2007 (FR) .................... 07 56138

(51) Int. Cl.
*B29C 70/44* (2006.01)
(52) U.S. Cl. ........................... 264/258
(58) Field of Classification Search .......... 264/258
See application file for complete search history.

(56) References Cited

U.S. PATENT DOCUMENTS

| 6,884,379 | B1 * | 4/2005 | Duqueine | 264/258 |
| 2001/0035249 | A1 * | 11/2001 | Kondo et al. | 156/65 |
| 2003/0173715 | A1 * | 9/2003 | Grutta et al. | 264/450 |
| 2007/0032928 | A1 | 2/2007 | Munoz | |

FOREIGN PATENT DOCUMENTS

| EP | 0255315 | 2/1988 |
| EP | 0344721 | 12/1989 |
| EP | 1151850 | 11/2001 |
| FR | 2519180 | 7/1983 |

* cited by examiner

*Primary Examiner* — Joseph Del Sole
*Assistant Examiner* — David N Brown, II
(74) *Attorney, Agent, or Firm* — Egbert Law Offices PLLC

(57) ABSTRACT

The invention relates to a method for making a thermoplastic composite part by molding. The method includes making several portions of the part according to a molding method, the molding method including placing, in a mold, a composite material containing fibers embedded in a thermoplastic matrix, while arranging the material so that the fibers contained therein are oriented along one or more preferred directions; submitting the mold to particular pressure and temperature conditions, knowing that for each of the different portions the fibers may be of different natures and dimensions, and may be oriented in different directions, while the thermoplastic matrix and that of the material used for making the first portion are identical or compatible; and assembling the different portions obtained, placing them in a mold, and submitting the latter to particular pressure and temperature conditions.

5 Claims, 1 Drawing Sheet

METHOD FOR MAKING A THERMOPLASTIC COMPOSITE PART BY MOLDING

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The object of this invention is a method for making a thermoplastic composite part by molding.

The aim of this invention is, in particular, to permit the manufacturing of composite parts of complex shapes, and having portions or areas that have to satisfy different requirements.

2. Description of Related Art Including Information Disclosed Under 37 CFR 1.97 and 37 CFR 1.98.

Methods for molding a thermoplastic composite part, designed to shape a composite material comprised of fibers embedded in a thermoplastic matrix are already known. The fibers can be made of different materials, for example glass, carbon or aramid, whereas the matrix is, for example, of an epoxide or phenolic or similar type.

The known methods are, for example, those described in EP 0 916 477 and EP 1 382 436. The first one relates to a method for molding a part made of a composite material from an unwoven web of fibers embedded in a thermosetting or thermoplastic matrix, where said layer, before the molding, is cut into a multiplicity of rectangular elements which are then arranged three-dimensionally.

The three-dimensional arrangement permits obtaining a preferred orientation of fibers having a length between 50 and 100 mm, in a defined area of the obtained part, so as to enhance the strength of said area designed to be subjected to a particular stress, the strength being limited due to the utilization of discontinuous fibers. The disadvantage of such a method resides in that the implementation of the three-dimensional arrangement remains a delicate operation that is costly in implementation time, and in that it is difficult to obtain a composite part comprising several areas capable of being subjected to stresses from different directions, and to have a good control over the orientations of fibers predefined initially at the stage of designing and dimensioning the parts to be made.

The second reference relates to a method for molding a part made of a composite material, consisting of placing, in a mold, a pile of layers taken from a web of fibers embedded in a thermosetting or thermoplastic matrix, and arranging according to preferred directions of said fibers, then subjecting said mold to particular pressure and temperature conditions.

This method permits obtaining composite parts having great strength and homogeneity, with a good control over the orientations of fibers in the case of parts having a simple geometry. However, in the case of a complex geometry, this method does not permit to fully guarantee the orientations of fibers predefined initially during the activity of designing the parts to be molded, said orientations being directly related to the dimensioning of said parts capable of resisting multiple stresses.

From EP 0 255 315 is also known a method for making rolled sheets out of reinforced thermoplastic material having layers, wherein the properties of elasticity and/or the degree of reinforcement of the layers are different, the material being aimed at being used in a molding operation. Such a method does not permit to solve the problem of manufacturing complex parts.

From EP 1 151 850 is also known a method for making parts out of reinforced composite material. This method claims to be able to manufacture a part by assembling preformed stratified sheets, then to assemble said preformed sheets and to connect them by an operation of heating under pressure in order to make a joggle joint. Besides the fact that it is reserved for processing semi-rigid materials based on thermosetting resins, this method does not permit solving the problem of manufacturing parts having complex shapes, i.e. other than those obtained as a result of assembling deformed sheets, and having portions or areas that should satisfy different requirements.

BRIEF SUMMARY OF THE INVENTION

The aim of this invention is to provide a method for making a thermoplastic composite part by molding so as to cope with the above-mentioned various disadvantages.

The method for making a thermoplastic composite part by molding according to the invention is characterized in that it consists of:

making a portion of said composite part, by means of a molding method, the molding method consisting of placing, in a mold, a composite material comprised of fibers embedded in a thermoplastic matrix, while arranging said material so that the fibers contained therein are oriented along one or more preferred directions, then submitting said mold to particular pressure and temperature conditions;

making at least a second portion of said composite part, by means of a molding method consisting of placing, in a mold, either a composite material comprised of fibers embedded in a thermoplastic matrix, while arranging said material so that the fibers contained therein are oriented along one or more preferred directions, or a material comprised of said thermoplastic matrix, then submitting said mold to particular pressure and temperature conditions, considering that for each of the different portions, the fibers, when they contain such, are capable of being of different natures and dimensions, and may be oriented in different directions, as well as in different proportions, whereas the thermoplastic matrix and that of the material used for making the first portion are identical or compatible; and assembling the different portions obtained, introducing them into a mold, then submitting the latter to particular pressure and temperature conditions.

The method according to the invention thus permits to obtain a composite part by assembling several portions each pre-consolidated by a molding operation.

The introduction of pre-consolidated portions permits to obtain an optimized control over the positions and orientations of reinforcing fibers.

It is possible to use different fibers for each of the portions, with however the obligation of using an identical or compatible thermoplastic matrix, so as to be able to make the multiple consolidations.

The nature and the dimensions of fibers used, as well as their proportion in the composite material, in a portion of a part, are chosen according to the necessities said portion should meet, i.e. for example, necessity of resistance to abrasion, to impact, necessity of rigidity, or of electrical or thermal conductivity.

Thus, according to the method, one can, among others, choose, in order to mold either one of the portions of the composite part to be made, a composite material comprised of electrically conducive fibers and/or of thermally conducive fibers.

According to an additional feature of the method according to the invention, the particular pressure conditions consist of high pressure conditions.

According to another additional feature of the method according to the invention, the high pressure consists of a pressure between 50 and 200 bars.

According to another additional feature of the method according to the invention, the particular temperature conditions consist of a heating temperature between 125 and 135° C.

The advantages and the features of the method according to the invention will become more obvious from the following description, when referring to the attached drawing, which represents a non-restrictive embodiment thereof.

DETAILED DESCRIPTION OF THE INVENTION

Figure 1:
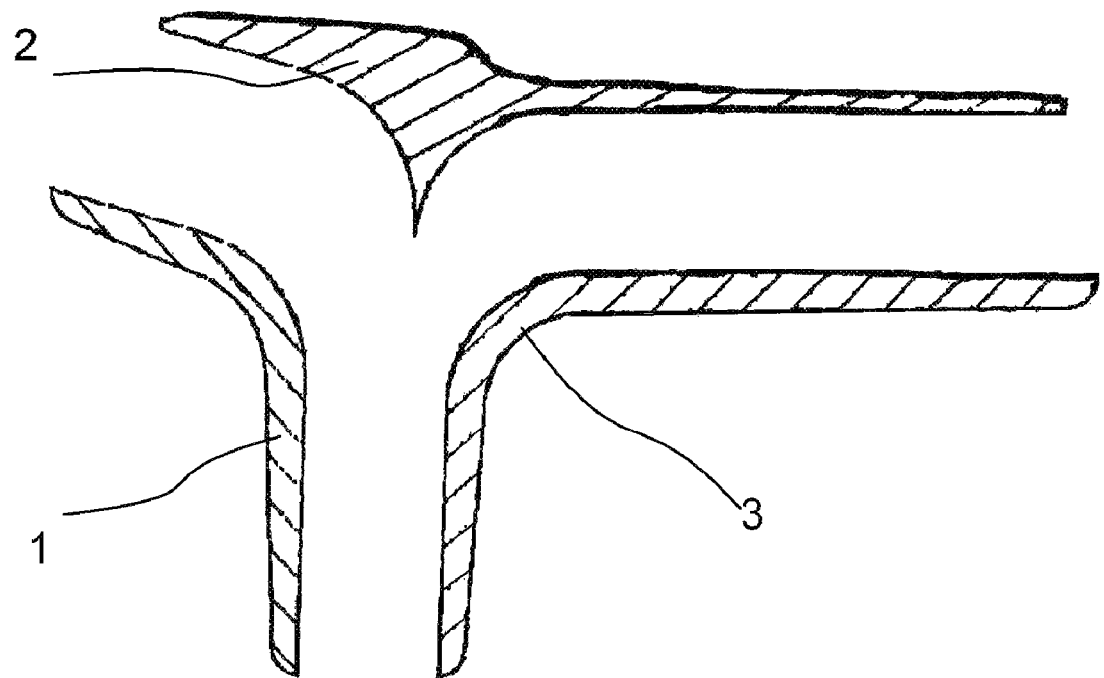
FIG. 1 represents a schematic view showing a stage of the manufacture of a composite part by means of the method according to the invention.

Referring to FIG. 1, one can see three elements 1, 2 and 3 made of a composite material, each manufactured according to a molding method consisting of placing, in a mold, a composite material comprised of fibers embedded in a thermoplastic matrix, while arranging said material so that the fibers contained therein are oriented along one or more preferred directions, then submitting said mold to particular pressure and temperature conditions.

Each one of the elements is manufactured and consolidated, and each has certain specificities because of the nature and dimensions of the fibers contained in the composite material used, but also according to the orientation given to said fibers when placing the composite material in the mold.

Figure 2:
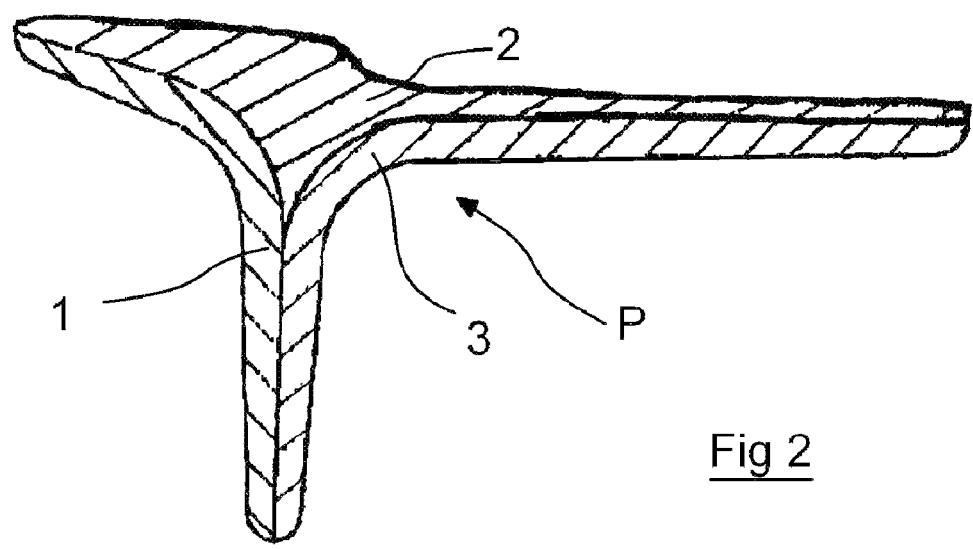
FIG. 2 represents a schematic view showing another stage of the manufacture of the same part.

Referring now to FIG. 2, one can see that the three elements 1, 2 and 3 are assembled so as to be introduced into a mold and to then submit the latter to particular pressure and temperature conditions, in order to finally obtain, after consolidation, a part P the portions of which have different specificities.

Advantageously, the thermoplastic matrices used are fully recyclable and can be consolidated many times, which is not possible, for example, with thermosetting resins.

Also advantageously, the method is implemented with dry materials favoring optimal placement of the fibers in a structure. Said materials can be preformed and pre-welded in given parts, for proper maintaining of the geometry, and then consolidated or reconsolidated to the adequate shape.

We claim:

1. A method of making a thermoplastic composite part by molding, the method comprising:
    placing a first composite material in a mold, said first composite material having fibers embedded in a thermoplastic matrix, said fibers being oriented along at least one direction;
    submitting said mold to a desired pressure and temperature condition so as to form a first portion of the composite part;
    placing a second composite material in another mold, said second composite material having fibers embedded in a thermoplastic matric, said fibers being oriented along at least one direction, the fibers of said first composite material being of a direction different than a direction of the fibers of said second composite material, the thermoplastic matrix of said first composite material being identical to or compatible with the thermoplastic matrix of said second composite material;
    submitting said another mold to a desired pressure and temperature condition so as to form a second portion of the composite part;
    assembling said first portion to said second portion;
    placing the assembled first portion and second portion in a further mold; and
    submitting the placed assembled first portion and second portion to a desired temperature and pressure condition.

2. The method of claim 1, the fibers of at least one of said first portion and said second portion being electrically conductive fibers.

3. The method of claim 1, the fibers of at least one of said first portion and said second portion being thermally conductive fibers.

4. The method of claim 1, the desired pressure condition of at least one of said molds being between 50 bars and 200 bars.

5. The method of claim 1, the desired temperature condition of at least one of said molds being between 125° C. and 135° C.

* * * * *